(12) United States Patent
Ki

(10) Patent No.: US 12,111,246 B2
(45) Date of Patent: Oct. 8, 2024

(54) MULTIFUNCTIONAL CORROSION PROBE SYSTEM

(71) Applicant: Byeong Ho Ki, Seoul (KR)

(72) Inventor: Byeong Ho Ki, Seoul (KR)

( * ) Notice: Subject to any disclaimer, the term of this patent is extended or adjusted under 35 U.S.C. 154(b) by 44 days.

(21) Appl. No.: 17/768,645

(22) PCT Filed: Aug. 20, 2020

(86) PCT No.: PCT/KR2020/011108
§ 371 (c)(1),
(2) Date: Apr. 13, 2022

(87) PCT Pub. No.: WO2021/075698
PCT Pub. Date: Apr. 22, 2021

(65) Prior Publication Data
US 2024/0110861 A1    Apr. 4, 2024

(30) Foreign Application Priority Data
Oct. 17, 2019    (KR) .......................... 10-2019-0129459

(51) Int. Cl.
*G01N 17/04*    (2006.01)
*G01N 17/00*    (2006.01)
*G01N 17/02*    (2006.01)

(52) U.S. Cl.
CPC ........... *G01N 17/04* (2013.01); *G01N 17/006* (2013.01); *G01N 17/02* (2013.01)

(58) Field of Classification Search
None
See application file for complete search history.

*Primary Examiner* — J. Christopher Ball
(74) *Attorney, Agent, or Firm* — Studebaker & Brackett PC

(57) ABSTRACT

Proposed is a multifunctional corrosion probe system that can sense both general corrosion and focusing corrosion of a pipe on the basis of physical changes of stacked specimens. The multifunctional corrosion probe system includes a sensing unit having a plurality of specimens and a plurality of insulating layers, which are alternately stacked, and configured to be inserted into a pipe, anode wires having first ends installed on first sides of the plurality of specimens, respectively, cathode wires having second ends installed on second sides of the plurality of specimens, respectively, a power control unit to which second ends of the plurality of anode wires and second ends of the plurality of cathode wires are connected, and a graph output unit connected with the power control unit, estimating a current that is output from the power control unit, and outputting a resistance graph and a current graph.

2 Claims, 5 Drawing Sheets

1

110 : 111, 112, 113
120 : 121, 122

Fig. 7
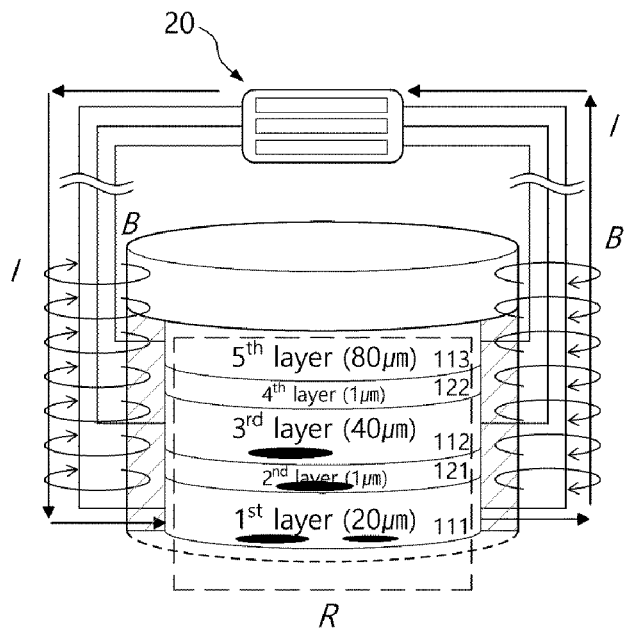
Fig. 8
(a)
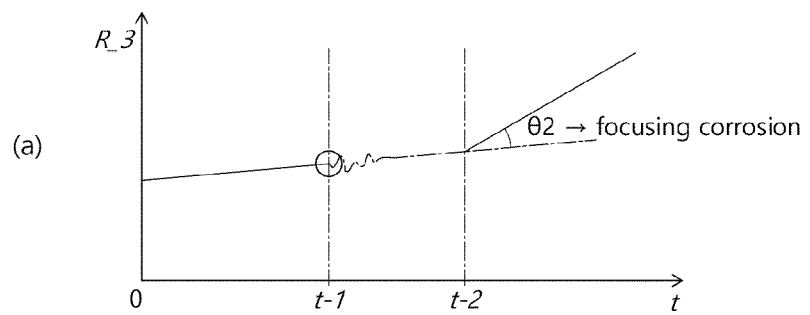
(b)
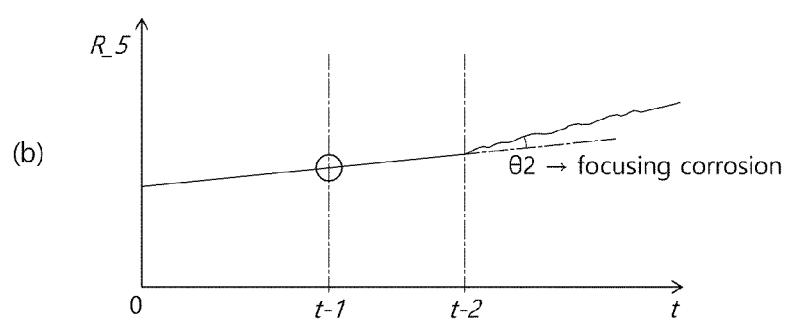

MULTIFUNCTIONAL CORROSION PROBE SYSTEM

CROSS-REFERENCE TO RELATED APPLICATIONS

This application is a National Phase application of International Application No. PCT/KR2020/011108, filed on Aug. 20, 2020, which claims benefit of priority to Korean Patent Application No. 10-2019-0129459, filed on Oct. 17, 2019, the entire content of which is incorporated herein by reference.

The present disclosure relates to a probe that provides information about corrosion and erosion of a pipe.

BACKGROUND ART

A pipe provides a route through which high-pressure gas and oil can move. A pipe is an important factor for stable movement of gas and oil. Accordingly, pipes are always managed and the necessity of management is also considered as important.

At present, as methods of managing pipes, a method of managing pipes while acquiring information about various types of corrosion and erosion of pipes and a method of calculating a corrosion rate due to general corrosion of pipes or focusing corrosion of pipes on the basis of the information are generally used.

However, devices that sense corrosion and erosion rates of pipes in the related art can measure only any one of general corrosion or focusing corrosion. Further, there is a problem that corrosion sensing based on software is used in most cases and corrosion and erosion rates due to physical changes cannot be calculated, so the reliability is low.

DISCLOSURE

Technical Problem

An objective of the present disclosure is to provide a multifunctional corrosion probe system that can measure a plurality of specimens and sense both general corrosion and focusing corrosion of a pipe on the basis of physical changes of stacked specimens.

The objective of the present disclosure is not limited to those described above and other objectives may be made apparent to those skilled in the art from the following description.

Technical Solution

In order to achieve the objectives, a multifunctional corrosion probe system of the present disclosure includes: a sensing unit having a plurality of specimens and a plurality of insulating layers, which are alternately stacked, and configured to be inserted into a pipe;
  anode wires having first ends installed on first sides of the plurality of specimens, respectively;
  cathode wires having second ends installed on second sides of the plurality of specimens, respectively;
  a power control unit having a first end connected to second ends of the plurality of anode wires, having a second end connected to second ends of the plurality of cathode wires, and applying electricity to the plurality of specimens; and
  a graph output unit connected with the power control unit, estimating a current that is output from the power control unit, and outputting a resistance graph and a current graph,
  in which the specimens include
  a first specimen, a second specimen, and a third specimen and are made of the same material as the pipe,
  the third specimen is thicker than the second specimen, and
  the second specimen is thicker than the first specimen,
  in which the insulating layers include
  a first insulating layer and a second insulating layer,
  the first insulating layer and the second insulating layer are formed in the same thickness, and
  the first insulating layer is inserted between the first specimen and the second specimen and the second insulating layer is inserted in the second specimen and the third specimen,
  in which the anode wires include:
  a first anode wire connected to the first side of the first specimen;
  a second anode wire connected to the first side of the second specimen; and
  a third anode wire connected to the first side of the third specimen,
  in which the cathode wires include:
  a first cathode wire connected to the second side of the first specimen;
  a second cathode wire connected to the second side of the second specimen; and;
  a third cathode wire connected to the second side of the third specimen,
  in which the control unit includes:
  a first power control module connected with the second end of the first anode wire and the second end of the first cathode wire;
  a second power control module connected with the second end of the second anode wire and the second end of the second cathode wire; and
  a third power control module connected with the second end of the third anode wire and the second end of the third cathode wire, and
  in which the graph output unit includes
  a computer, in which software receiving an estimated current and converting and outputting current values into a resistance graph and a current graph, and a warning generation module configured to generate a warning when a resistance value or a current value changes over a reference value.

The plurality of specimens may be made of the same material as the pipe, and the plurality of specimens and plurality of insulating layers may be stacked and covered with an insulating module.

Advantageous Effects

The multifunctional corrosion probe system according to the present disclosure can sense both general corrosion and focusing corrosion of a pipe and can more accurately find out a corrosion state of a pipe. Further, the present disclosure senses corrosion of a pipe on the basis of a physical state change of a probe unit and can show high reliability of measured information.

DESCRIPTION OF DRAWINGS

FIGS. 5 to 8 are graphs showing resistance values of layers of corroded layers and resistance values of non-corroded layers when layers of the probe unit of FIG. 1 are corroded.

BEST MODE

Figure 1:
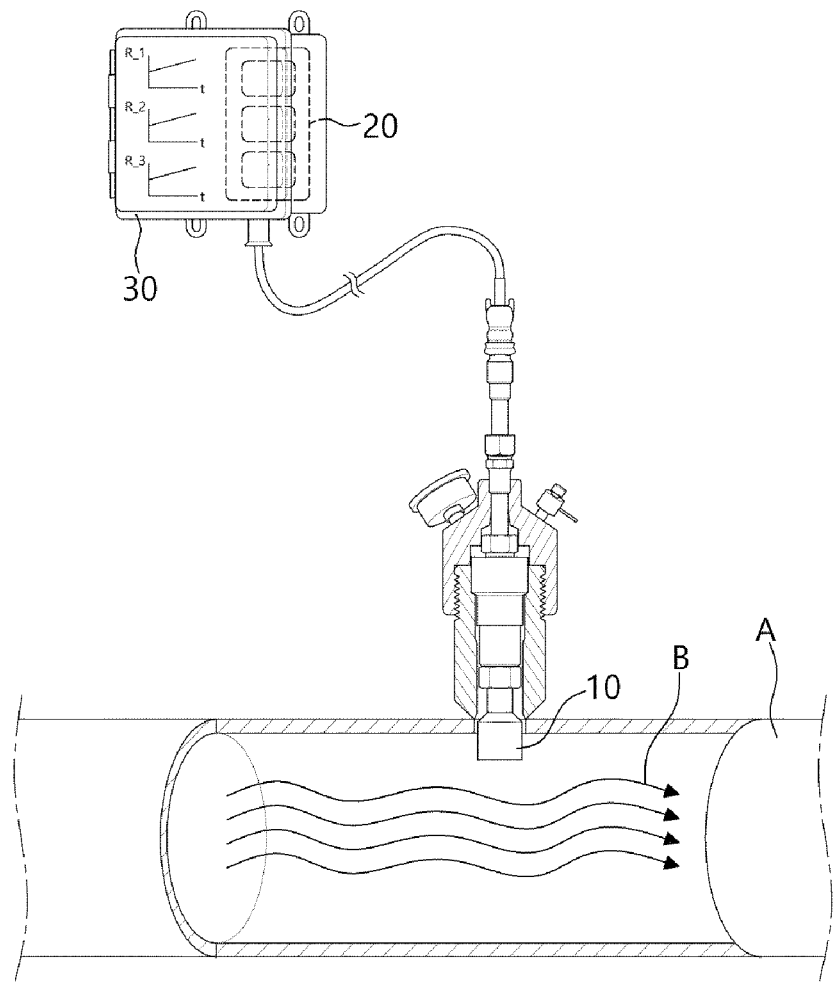
FIG. 1 is a view showing a use state of a multifunctional corrosion probe system according to an embodiment of the present disclosure.

Hereinafter, embodiments of the present invention are described in detail with reference to the accompanying drawings. Embodiments of the present disclosure are provided to more completely explain the present disclosure to those skilled in the art. The following embodiments are provided only to explain the present disclosure and the scope of the present disclosure is not limited to the embodiments.

Some of the components of the present disclosure may be slightly exaggerated in the drawings to clearly explain the present disclosure with reference to the drawings, so the shape of the present disclosure may not be the same as those shown in the figures.

Hereafter, a multifunctional corrosion probe system according to the present disclosure is described with reference to the drawings provided to help understand the description of the present disclosure. However, in order to make description of the present disclosure definite and brief, a multifunctional corrosion probe system and an example in which the multifunctional corrosion probe system is used are generally described.

FIG. 1 is a view showing a use state of a multifunctional corrosion probe system according to an embodiment of the present disclosure.

A multifunctional corrosion probe system 1, as shown in FIG. 1, is disposed in a pipe A through which gas B flows and can sense both general corrosion and focusing corrosion of the pipe on the basis of physical deformation of a plurality of specimens and a resistance variation of each of the specimens. In other words, the multifunctional corrosion probe system 1 can measure both gradual corrosion and rapid corrosion of a pipe on the basis of physical deformation and a resistance variation of a specimen. The pipe A in this embodiment is a pipe of which the thickness is reduced by Flow Accelerated Corrosion (FAC) or erosion due to gas flowing through the pipe.

The multifunctional corrosion probe system 1 of the present disclosure includes a sensing unit 10 in which a plurality of specimens 110 and a plurality of insulating layers 120 are stacked, a power control unit 20 connected with the sensing unit 10 through electrode wires, and a graph output unit 30 connected with the power control unit and constructing a graph on the basis of received data.

Hereafter, components of the multifunctional corrosion probe system are described in detail with reference to FIG. 2.

Figure 2:
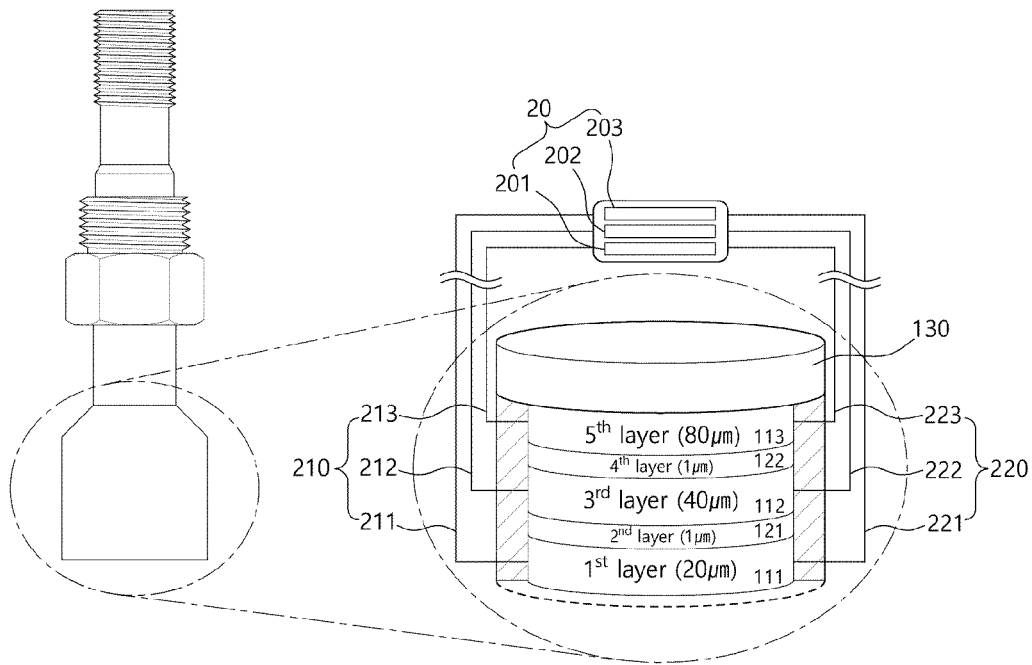
FIG. 2 is a view showing structure of the probe according to an embodiment of the disclosure.

FIG. 2 is a view showing structure of the probe according to an embodiment of the disclosure.

The sensing unit 10 senses erosion and corrosion of a pipe. The sensing unit 10 has a first end that is inserted into a portion of the pipe A and a second end connected with the power control unit 20.

The sensing unit 10 may be composed of a plurality of specimens 110 made of the same material as the pipe A, a plurality of insulating layers 120 inserted between the specimens 110, an insulating module 130 covering the specimens 110 and the insulating layers 120 and blocking electric waves generated by the power control unit 20, etc. For example, the sensing unit 10 may have a structure in which a first specimen 111 is formed, a first insulating layer 121 is formed on the first specimen 111, a second specimen 112 is stacked on the first insulating layer 121, a second insulating layer 122 is formed on the second specimen 112, and a third specimen 113 is formed on the second insulating layer 122. Further, in the structure, the stacked plurality of specimens 110 and plurality of insulating layers 120 are surrounded by the insulating module 130. The specimens 110 of the sensing unit 10 are corroded or bored to correspond to erosion and corrosion of the pipe A and the sensing unit 10 can sense corrosion of the pipe on the basis of the intensity of a current that is output from the power control unit 20.

The specimens and the insulating layers of the sensing unit 10 may be formed in a micro level so that corrosion of the pipe A can be found within the shortest time. For example, the third specimen 113 may be formed in a thickness of 80 μm, the second specimen 112 may be formed in a thickness of 40 μm smaller than the thickness of the third specimen, and the first specimen 111 may be formed in a thickness of 20 μm smaller than the thickness of the second specimen 112. That is, the third specimen 113 may be formed thicker than the second specimen 112 and the second specimen 112 may be formed thicker than the first specimen 111. Further, the first insulating layer 121 and the second insulating layer 122 are formed in the same thickness, that is, the thickness thereof may be 1 μm that is 20 times smaller than that of the first specimen. In order to minimize influence on corrosion of a pipe, the first insulating layer 121 and the second insulating layer 122 are made of a material that has high durability against temperature and pressure and is very vulnerable to water and a corrosion environment.

The power control unit 20 applies electricity to the specimens 110 so that a current flows to the specimens 110. In other words, the power control unit 20 is connected to the first end and the second end of each of the specimens 110 through a plurality of anode wires 210 and a plurality of cathode wires 220, thereby applying electricity to the specimens 110. The anode wires 210 are a first anode wire 211 connected to a first side of the first specimen 111, a second anode wire 212 connected to a first side of the second specimen 112, and a third anode wire 213 connected to a first side of the third specimen. The cathode wires 220 are a first cathode wire 221 connected to a second side of the first specimen, a second cathode wire 222 connected to a second side of the second specimen, and a third cathode wire 223 connected to a second side of the third specimen.

In order to correspond to the first anode wire 211 to the third anode wire 213 and the first cathode wire 221 to the third cathode wire 223, the power control unit may include a first power control module 201 connected with a second end of the first anode wire and a second end of the first cathode wire, a second power control module 202 connected with a second end of the second anode wire and a second end of the second cathode wire, and a third power control module 203 connected with a second end of the third anode wire and a second end of the third cathode wire. The first power control module 201 to the third power control module 203 are individually operated and can apply a current to the first specimen 111 to the third specimen 113 with influencing each other. Further, the first to third power control modules can transmit data about the first specimen 111 to the third specimen 113 to the graph output unit 30, respectively.

Figure 4:
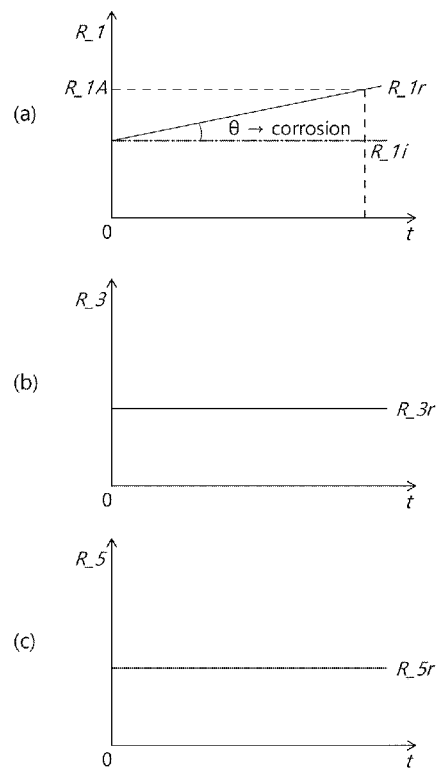
FIG. 4 is a graph showing resistance values of a first specimen, a second specimen, and a third specimen of a probe unit measured by a monitoring unit of FIG. 1.

The graph output unit 30 is connected with the power control unit 20 and estimates a current that is output from the power control unit 20. Further, the graph output unit can output a resistance variation graph or a current variation graph over time on the basis of the estimated current value. The graph output unit 30 may be a computer in which software for converting and outputting received data into a graph is installed. The graph output unit 30 further includes a warning generation module 21, thereby being able to generate a warning when a resistance variation or a current variation becomes a reference value or more. For example, the warning generation module 21, as shown in FIG. 4(a), generates a warning when a resistance value reaches R_1A. R on the Y-axis in the graph shown in FIG. 4 is a loss of a specimen.

Hereafter, the state in which the multifunctional corrosion probe system is operated and senses general corrosion of a pipe is described with reference to FIGS. 3 and 4.

Figure 3:
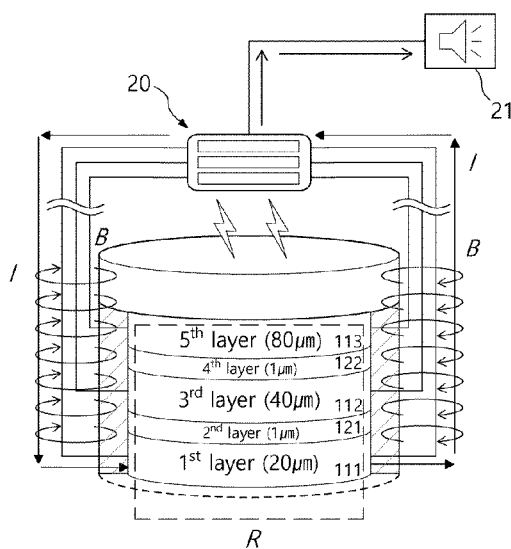
FIG. 3 is an operation view of the multifunctional corrosion probe system according to an embodiment of the present disclosure.

FIG. 3 is an operation view of the multifunctional corrosion probe system according to an embodiment of the present disclosure and FIG. 4 is a graph showing resistance values of a first sample, a second sample, and a third sample of a probe unit measured by a monitoring unit of FIG. 1.

The first specimen 111, the second specimen 112, and the third specimen 113 may be pieces for measuring corrosion of a pipe. The first specimen 111, the second specimen 112, and the third specimen 113 may be made of the same material as a pipe to more accurately find out corrosion of the pipe.

As shown in FIG. 3, the first specimen 111 to the third specimen 113 are connected with the power control unit 20, thereby being able to receive a current from the power control unit 20. The first specimen 111 to the third specimen 113 are conductors, but may be resistances in terms of a current. The resistance values of the first specimen 111 to the third specimen 113 may be shown like FIGS. 4(a) to (c). The first specimen 111 may show a resistance value that gradually increases with corrosion of a pipe A, and the second specimen 111 and the third specimen 113 may show resistance values that are constant over time.

Hereafter, the state in which the multifunctional corrosion probe system is operated and senses both general corrosion and focusing corrosion of a pipe is described with reference to FIGS. 5 and 8.

FIGS. 5 to 8 are graphs showing resistance values of layers of corroded layers and resistance values of non-corroded layers when layers of the probe unit of FIG. 1 are corroded.

Figure 5:
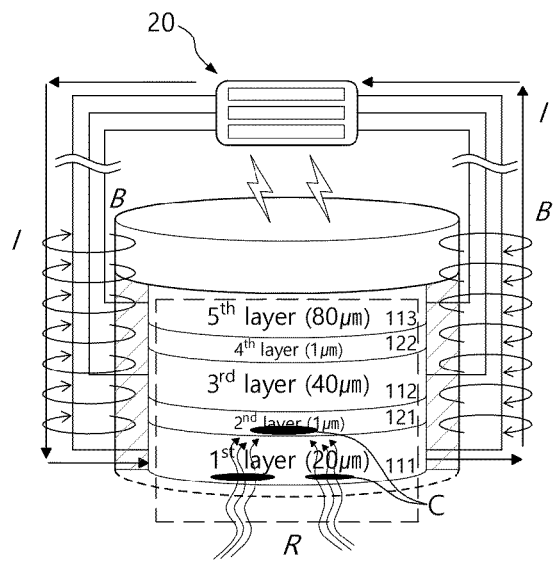
Figure 6:
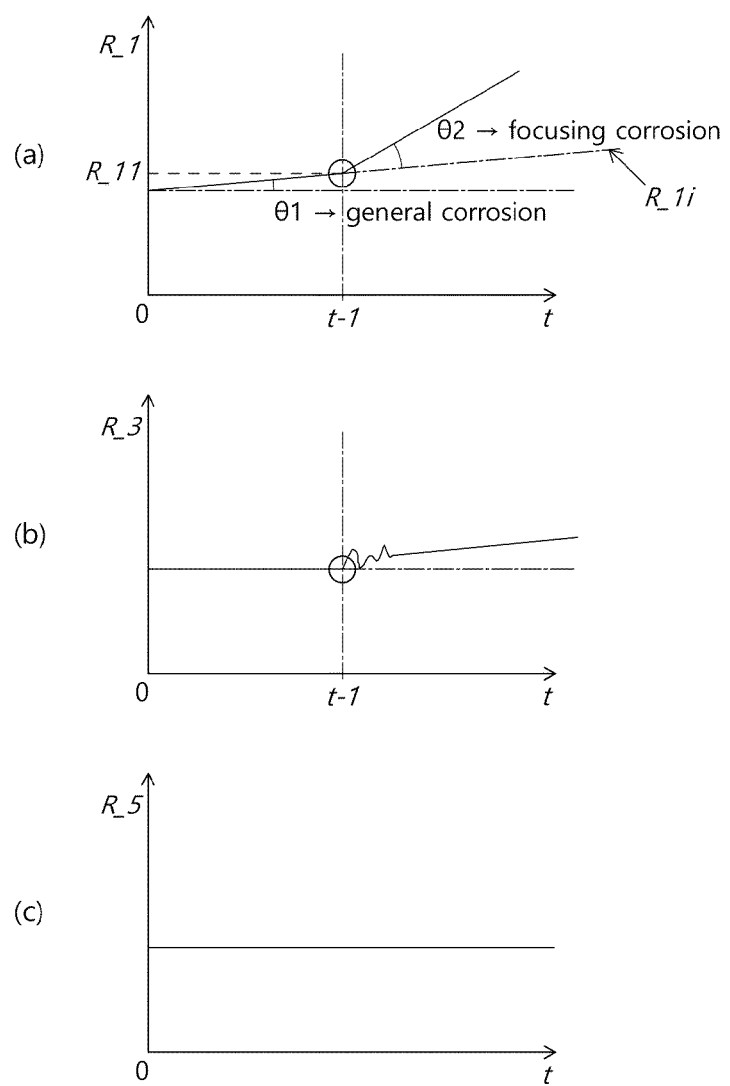

As shown in FIG. 5, a hole C may be formed in the first specimen 111, which is a first layer, due to gas flowing through a pipe A. In this case, the resistance value of the first specimen 111, as shown in FIG. 6(a), may gradually change from the time point 0 to t-1 and may rapidly change after t-1. When the hole C is formed in the first specimen 111, a hole C may be formed at the same time in the first insulating layer 121 that is a second layer. Accordingly, the resistance value of the second specimen that is a third layer, as shown in FIG. 6(b), may change after the time point t-1. On the other hand, the resistance value of the third specimen 113 that is a fifth layer, as shown in FIG. 6(c), may keep constant from the time point 0.

As shown in FIG. 7, when a hole C is formed in the third specimen 113 after a predetermined time passes from formation of the hole in the first specimen 111, that is, the time point t-2, the resistance value of the third specimen 113 may rapidly increase, as shown in FIG. 8(b). Further, a hole is formed in the second insulating layer 122 that is a fourth layer, so the resistance value of the third specimen 113 that is a fifth layer may change as shown in FIG. 8(b).

The multifunctional corrosion probe system 1 can find out general corrosion of a pipe on the basis of the gradual resistance variation of the first specimen 111 at the lowest position. Further, when holes are formed in the first specimen to the third specimen 111~113, the multifunctional corrosion probe system 1 can sense a rapid resistance variation of the specimens. For example, in the multifunctional corrosion probe system 1, as shown in FIG. 6(c), the resistance value of the first specimen 111 may gradually increase up to R_11 from the time point 0 to t-1. Accordingly, it is possible to extract information that the pipe has gradually corroded about 10-12 μm. Further, the multifunctional corrosion probe system 1 can find out that general corrosion is in progress in the pipe from the information. When holes are formed in the first specimen 111, the third specimen 1113, etc. and resistance values and current values rapidly change, the multifunctional corrosion probe system 1 can find out that focusing corrosion is in progress around the sensing unit 10. In other words, the multifunctional corrosion probe system 1 can find out both general corrosion and focusing corrosion of the pipe A on the basis of physical deformation of a plurality of specimens and a resistance variation of each of the specimens.

Although exemplary embodiments of the present disclosure were described above with reference to the accompanying drawings, those skilled in the art would understand that the present disclosure may be implemented in various ways without changing the necessary features or the spirit of the prevent disclosure. Therefore, the embodiments described above are only examples and should not be construed as being limitative in all respects.

The invention claimed is:

1. A multifunctional corrosion probe system comprising:
 a sensing unit (10) having a plurality of specimens (110) and a plurality of insulating layers (120), which are alternately stacked, and configured to be inserted into a pipe (A);
 anode wires (210) having first ends installed on first sides of the plurality of specimens, respectively;
 cathode wires (220) having second ends installed on second sides of the plurality of specimens, respectively;
 a power control unit (20) having a first end connected to second ends of the plurality of anode wires, having a second end connected to second ends of the plurality of cathode wires, and applying electricity to the plurality of specimens; and
 a graph output unit (30) connected with the power control unit (20), estimating a current that is output from the power control unit (20), and outputting a resistance graph and a current graph,
 wherein the specimens (110) include a first specimen (111), a second specimen (112), and a third specimen (113) and are made of the same material as the pipe (A),
 the third specimen (113) is thicker than the second specimen (112), and
 the second specimen (112) is thicker than the first specimen (111),
 wherein the insulating layers (120) include a first insulating layer (121) and a second insulating layer (122),
 the first insulating layer (121) and the second insulating layer (122) are formed in the same thickness, and
 the first insulating layer (121) is inserted between the first specimen (111) and the second specimen (112) and the second insulating layer (122) is inserted in the second specimen (112) and the third specimen (113), wherein the anode wires (210) include:

a first anode wire (211) connected to the first side of the first specimen;

a second anode wire (212) connected to the first side of the second specimen; and a third anode wire (213) connected to the first side of the third specimen, wherein the cathode wires (220) include:

a first cathode wire (221) connected to the second side of the first specimen;

a second cathode wire (222) connected to the second side of the second specimen; and a third cathode wire (223) connected to the second side of the third specimen, wherein the power control unit (20) includes:

a first power control module (201) connected with the second end of the first anode wire and the second end of the first cathode wire;

a second power control module (202) connected with the second end of the second anode wire and the second end of the second cathode wire; and a third power control module (203) connected with the second end of the third anode wire and the second end of the third cathode wire, and wherein the graph output unit (30) includes a computer, in which software receiving an estimated current and converting and outputting current values into a resistance graph and a current graph, and a warning generation module (21) configured to generate a warning when a resistance value or a current value changes over a reference value.

2. The multifunctional corrosion probe system of claim 1, wherein the plurality of specimens (110) is made of the same material as the pipe (A), and the plurality of specimens (110) and plurality of insulating layers (120) are stacked and covered with an insulating module (130).

* * * * *